Oct. 11, 1932.    H. MORLEY ET AL    1,881,843
ANTIRATTLE SPRING ASSEMBLY
Filed Nov 29, 1929
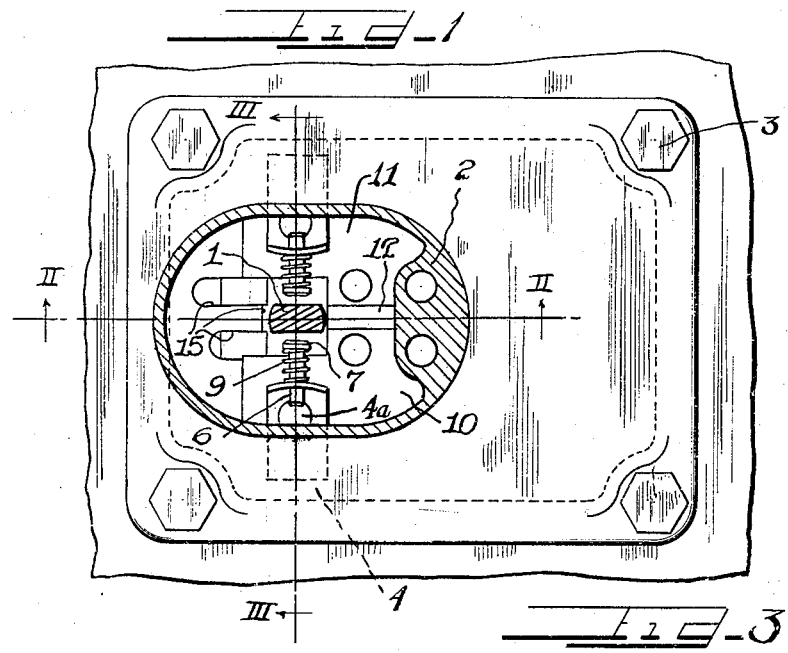
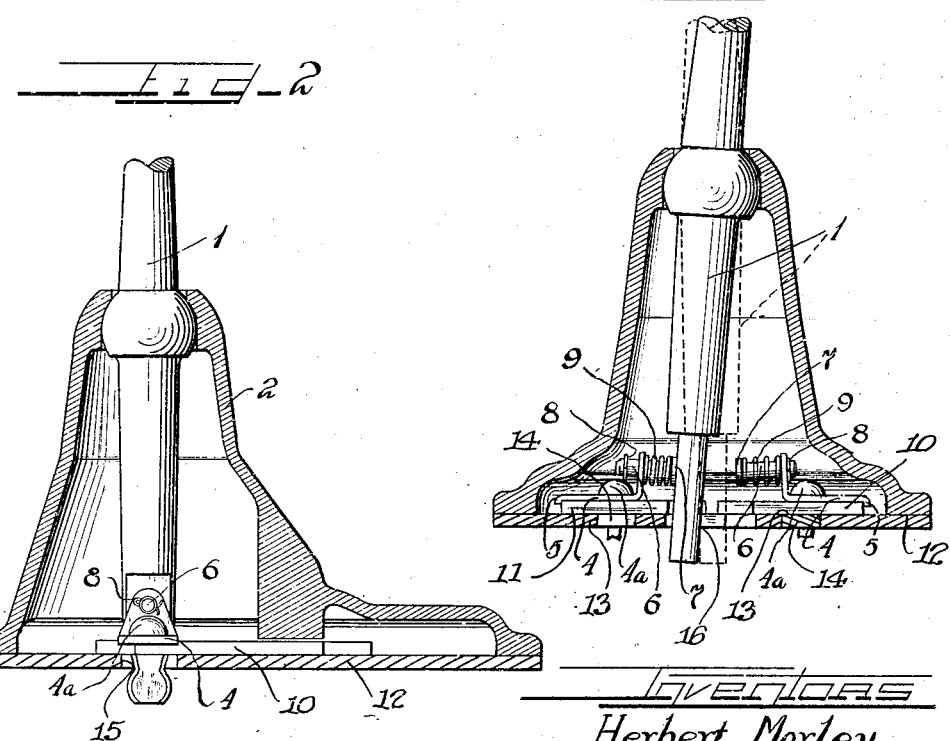
Inventors
Herbert Morley
John C. Buchanan
David T. Sicklesteel
by Charles ＿＿＿ Attys Patented Oct. 11, 1932

1,881,843

UNITED STATES PATENT OFFICE

HERBERT MORLEY, JOHN C. BUCHANAN, AND DAVID T. SICKLESTEEL, OF DETROIT, MICHIGAN, ASSIGNORS TO DETROIT GEAR & MACHINE COMPANY, OF DETROIT, MICHIGAN, A CORPORATION OF MICHIGAN

ANTIRATTLE SPRING ASSEMBLY

Application filed November 29, 1929. Serial No. 410,294.

This invention relates to a control lever, and more particularly to an improved control lever, which embraces an anti-rattle device.

It is an object of this invention to provide an anti-rattle device which is simple, easily constructed, and effective to prevent vibration rattles in a gear shifting lever.

It is also an object of this invention to provide an anti-rattle device which will engage with the control lever of a gear shifting mechanism, when said lever is shifted from its normal position, and thereby prevent the same from vibrating.

Other and further important objects of this invention will be apparent from the disclosures in the accompanying drawing and the following specification.

The invention (in a preferred form) is illustrated on the drawing and hereinafter more fully described.

On the drawing:

Figure 1 is a plan view of a conventional type gear shifting control lever and control base, showing this invention embodied therein.

Figure 2 is a fragmental side elevational view partly in section, of the device shown in Figure 1, taken substantially on line II—II of Figure 1.

Figure 3 is a transverse elevational view partly in section, of the device shown in Figure 1, taken substantially on line III—III of Figure 1.

As shown on the drawing:

In the illustrated embodiment of this invention, there is shown in Figure 1 a conventional type control lever 1 which is mounted in a control lever base 2 by means of a ball and socket joint connection. The control lever base is secured to the gear casing by means of holding down bolts 3. The lower end of the control lever is formed in the usual manner to facilitate connection to a gear shifting fork, not shown in the drawing.

The invention is shown as embracing two similar anti-rattle devices, one of said devices being mounted on each side of the control lever in a manner which will subsequently be more fully described. Since these two devices are entirely similar, only one will be described. A supporting bracket 4, which is fixedly secured in position by a rivet 4ª or other well known means, is stamped from a flat sheet in such a manner that a depending flange 5 is formed on one end. The other end is upwardly turned and provided with an aperture for receiving a plunger 6. The inner end of this plunger is formed into a circumferential flange 7 which forms a head on the plunger. The other end of the plunger is drilled to receive a cotter pin 8, which prevents the plunger from being withdrawn from the aperture. A coil spring 9 coaxially extends around the plunger between the supporting bracket and the plunger head, to force the plunger in a longitudinal direction, thereby bringing the head of the plunger to a position adjacent the control lever, when said lever is in the normal or neutral position, as shown in Figure 1.

The anti-rattle device comprising this invention is illustrated in connection with a conventional gear shifting mechanism of well-known construction. While the mechanism in this instance is of the type in which the various elements are formed from stamped plates, it is contemplated that the device may also be used with other well-known types of shifting mechanisms.

As illustrated, one of the anti-rattle devices is mounted on each side of the control lever 1, the rivet 4ª fixedly securing one of the supporting brackets 4 to each of the shift mesh lock plates 10 and 11 so as to be movable therewith. The shift mesh lock plates, which serve to lock the gears in mesh when they have been shifted to change the speed, are mounted for longitudinal sliding movement over the upper surface of a stationary shifter plate 12. The plate 12 is provided with a guide slot 13 for receiving a movable guide member 14 which is connected to each of the shift mesh lock plates by the rivet 4ª. This rivet also extends through a shifter fork member (not shown) which slidably bears against the under surface of the shifter plate 12, and is operable by the movement of the lower end of the control lever 1. The movement of the lower end of the control lever is defined by a conventional H-slot 15 in the shifter plate, the end of said lever projecting therethrough. Since the operation of this type of gear shifting mechanism is well known in the art, further description of it is not deemed necessary.

The operation of the device is as follows: With the control lever in the neutral position as shown in Figure 1, in which case it is in the connecting portion of the H slot, it is not engaged by the plungers; hence the anti-rattle device has no effect. If, however, the control lever is now moved to the right or left in the neutral position preparatory to shifting the same into one of the lateral portions of the H slot for shifting the gears, one of the plungers 6 will be engaged by the lever and moved against the pressure of its coil spring 9. If the lever is now moved from this position, towards the forward or rear end of the lateral portion of said slot, the associated shift mesh lock plate, guide member, and shifting fork will be moved as a unit, the result being that the plunger 6 will continue to engage the lever 1 during this movement and push it against a side edge of the lateral portion of the slot as shown at 16 in Figure 3, thereby securing the same against rattling.

This invention, therefore, provides an anti-rattle device which is simple, easily constructed, and effective to prevent vibration rattles in a gear shifting lever.

We are aware that numerous details of construction may be varied through a wide range without departing from the spirit of this invention, and we, therefore, do not purpose limiting the patent granted otherwise than necessitated by the prior art.

We claim as our invention:

1. A gear shifting mechanism comprising a control lever, a stationary plate having a guide slot for receiving the operated end of said lever, a second plate slidably associated with said stationary plate and responsive to the movement of said lever through said slot, a bracket carried by said second plate having an upturned apertured end, a plunger spaced from said plates extending through said aperture and movable longitudinally therein, the axis of said plunger being disposed substantially parallel to the surfaces of said plates, a spring for maintaining an end of said plunger in engagement with said lever, said lever when operated being forced against an edge of the guide slot and held against vibration.

2. In a gear shifting mechanism, the combination of a control lever, a stationary shifter plate having a slot for receiving the operated end of said lever, a lock mesh plate in slidable surface engagement with the stationary plate and operatively associated with the operated end of said lever, with means for resiliently maintaining said lever against the edge of the slot for preventing vibration of the lever when operated from normal position, said means comprising an angle bracket having one leg secured to the lock mesh plate, the other leg extending upwardly from said lock mesh plate at substantially a right angle to its surface and having an aperture adjacent its outer end, a plunger axially movable in said aperture, a spring for resisting the axial movement of said plunger in one direction, and means for limiting the axial movement of the plunger in the other direction.

In testimony whereof, we have hereunto subscribed our names at Detroit, Wayne County, Michigan.

HERBERT MORLEY.
JOHN C. BUCHANAN.
DAVID T. SICKLESTEEL.